United States Patent
Yamauchi et al.

[11] Patent Number: 5,299,244
[45] Date of Patent: Mar. 29, 1994

[54] FUEL ASSEMBLY

[75] Inventors: Koki Yamauchi, Hitachi; Yasunori Bessho, Mito; Sadayuki Izutsu, Hitachi, all of Japan

[73] Assignee: Hitachi, Ltd., Tokyo, Japan

[21] Appl. No.: 772,440

[22] Filed: Oct. 7, 1991

[30] Foreign Application Priority Data

Oct. 5, 1990 [JP] Japan .................. 2-266229

[51] Int. Cl.$^5$ ............................. G21C 3/34
[52] U.S. Cl. ...................... 376/438; 376/434; 376/441
[58] Field of Search ............ 376/438, 434, 441; 976/DIG. 63, DIG. 64

[56] References Cited

U.S. PATENT DOCUMENTS

| | | | |
|---|---|---|---|
| 4,588,550 | 5/1986 | Blomstrand et al. | 376/438 |
| 4,777,016 | 10/1988 | Yoshioka et al. | 376/444 |
| 4,789,520 | 12/1988 | Morimoto et al. | 376/419 |
| 4,863,680 | 9/1989 | Sakurada et al. | 376/444 |
| 5,068,082 | 11/1991 | Ueda et al. | 376/428 |

*Primary Examiner*—Donald P. Walsh
*Assistant Examiner*—Meena Chelliah
*Attorney, Agent, or Firm*—Antonelli, Terry, Stout & Kraus

[57] ABSTRACT

A plurality of fuel rods containing fissile material are arranged in triangle lattices. A plurality of water rods groups are arranged among the fuel rods. Each of the water rods groups includes no fuel rod but a plurality of water rods which are arranged adjacently each other in triangle lattices having substantially same pitch as the fuel rods. The water rods groups are arranged not adjacently each other, and are surrounded with the fuel rods. the outer diameter of the water rod is smaller than the pitch. The fuel assembly is able to suppress increment of pressure loss because of formation of coolant path among adjacent water rods. Further, void reactivity coefficient is able to be small.

5 Claims, 6 Drawing Sheets

1

FUEL ASSEMBLY

BACKGROUND OF THE INVENTION

The present invention relates to a fuel assembly, especially to the fuel assembly preferable for use in boiling water reactors.

In the boiling water reactors, cooling water having moderating function exists in two regions, namely, two phase flow region in the channel box and saturated water region outside of the channel box. In limited space in the reactor core, the optimum value for area ratio of the two regions is different depending on evaluating subjects.

In order to improve fuel economy of the boiling water reactor by achieving high burn up of fuel assemblies, life extension of the fuel assemblies, and uranium saving, there are many methods such as a method of arranging unboiled region, namely, a plurality of water rods, in the fuel assembly, a method of increasing uranium inventory in the fuel assembly, and a method of increasing composing lattice number of fuel rods etc. One of the example of the prior art is the fuel assembly disclosed in JP-A-62-217186 (1987). The fuel assembly has a fuel arrangement of 9 lines by 9 rows, and two water rods having large diameter arranged adjacently in diagonal direction of the fuel rod arrangement. Using the fuel assembly, fuel economy can be improved by increasing of composing lattice number and unboiled region and flattening of power distribution without decreasing the uranium inventory.

And, making void reactivity coefficient close to zero as possible is required for the boiling water reactor in order to improve safety and operability of the reactors.

Void in the boiling water reactor changes depending on power level and coolant flow rate, and causes change of coolant density during reactor operation.

Void reactivity coefficient of the boiling water reactor has a large negative value. The negative void reactivity coefficient has an effect to suppress power increase when reactivity is added. Therefore, if abnormal phenomena which will cause pressure increase in the reactor is generated and such control operation to suppress the pressure increase as control rods insertion is not performed, void in the reactor is decreased, and subsequently rapid power increase is caused by addition of positive reactivity. Consequently, there is a possibility to cause failure of fuel rods by overheating.

Accordingly, lessening of the void reactivity coefficient can moderate the above described abnormal phenomena, and is able to improve safety and operability of the reactor.

As to methods for the lessening of the void reactivity coefficient, a method of increasing water to fuel volume ratio in case of using enriched uranium and plutonium fuel, a method of decreasing water to fuel volume ratio in case of using plutonium fuel, and a method of decreasing void generating area in the case of using enriched uranium and plutonium fuel can be considered.

An example of the methods of increasing water to fuel volume ratio is disclosed in JP-A-63-25592 (1988). The cited reference describes the method in which the cross sectional area of the fuel assembly is increased to almost twice, total cross sectional area of the water rods is increased, and moderator (water) and fuel (uranium) in the fuel assembly are homogenized so as to distribute almost equal quantity of unboiling water to each of fuel rods in order to improve neutron moderating effect and to accelerate effective burning of the uranium by increasing of cross sectional area of the water rods without decreasing the uranium inventory per a fuel assembly.

An example of the methods of decreasing water to fuel volume ratio is disclosed in JP-A-62-259086 (1987). The cited reference describes the method to make the number of M closest integer of 0.87 N when assign N to the number of fuel rods arranged line and M to the number of fuel rods arranged row (both N and m are integers) in a high conversion nuclear reactor loaded with a plurality of fuel assemblies having fuel rods arrangement of triangle lattices. The high conversion nuclear reactor is aimed at positive conversion of uranium-238 to fissile plutonium-239 by decreasing moderating effect on neutron with small water to fuel volume ratio.

In order to decrease the void reactivity coefficient as above described, it is necessary to make remarkable design change to the boiling water reactor such as making the fuel assembly large, or to make the reactor high conversion type etc.

SUMMARY OF THE INVENTION

The object of the present invention is to provide a fuel assembly which is able to improve fuel economy without increasing pressure loss, and to decrease void reactivity coefficient.

The present invention is characterized in comprising a plurality of fuel rods containing nuclear fuel material and being arranged in triangle lattices, and a plurality of water rods group which are arranged among the fuel rods, and that the water rods group includes no fuel rod but a plurality of water rods arranged adjacently each other in triangle lattices with substantially same pitch as the fuel rods, outer diameter of the water rod is smaller than the above described pitch, and the water rods groups are arranged not adjacently each other but being surrounded with fuel rods.

In accordance with the present invention, pressure loss of the fuel assembly is not so increased as decreasing of coolant path area among fuel rods by arranging the fuel rods in triangle lattices because of formation of coolant path between adjacent water rods included in the water rods group. As a plurality of water rods groups are located not adjacently but dispersedly in the fuel assembly, fuel economy is improved. Further, as the water rods group has a plurality of water rods adjacently, void fraction in the region surrounded with the water rods is decreased, and the void reactivity coefficient becomes small.

DETAILED DESCRIPTION OF THE PREFERRED EMBODIMENTS

A fuel assembly which is one of the preferred embodiments of the present invention is explained hereinafter referring to FIG. 1.

Figure 8:
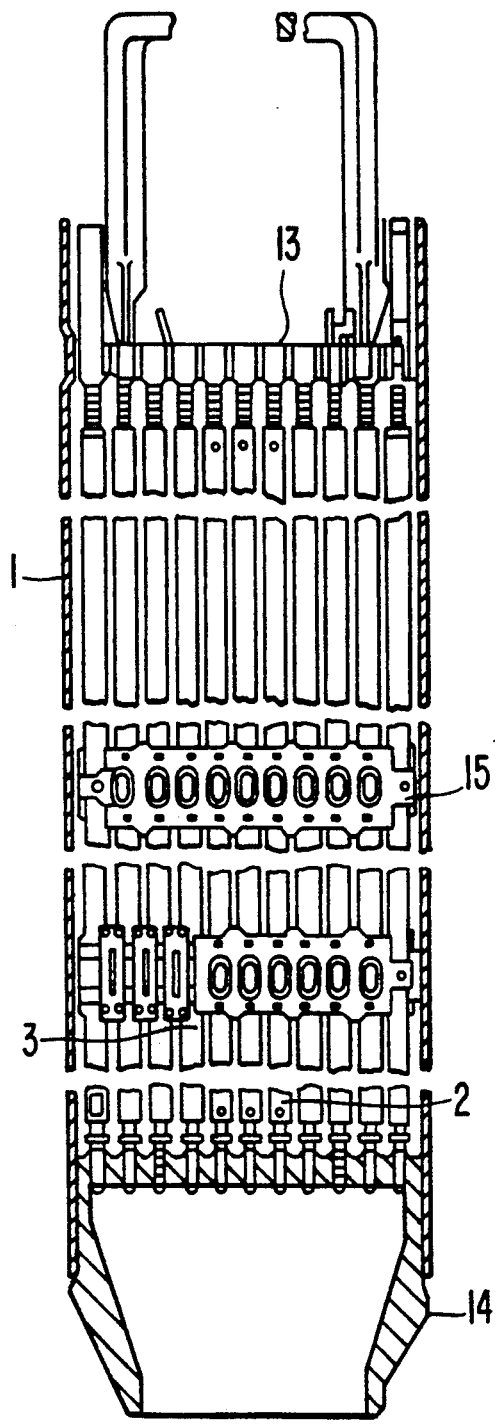
FIG. 8 is a vertical cross-section of the fuel assembly of FIG. 1.

The fuel assembly 10A of the present embodiment comprises a channel box 1 having fuel rods 3 arranged in triangle lattices. The fuel assembly 10A has a water rods group 7A and four water rods groups 7B. The water rods group 7A is arranged at the center of the cross section of the fuel assembly 10A, and the water rods groups 7B are arranged at surrounding of the water rods group 7A. The water rods group 7A has no fuel rod 3 inside but seven water rods 2 arranged adjacently each other. The water rods group 7B has also no fuel rod 3 inside but three water rods 2 arranged adjacently each other. The water rods 2 in the water rods groups are arranged in triangle lattices as same as fuel rods 3. The arranging pitch of the water rods 2 is same as the arranging pitch of the fuel rods 3. The water rods group 7A and the water rods groups 7B, and the water rods groups 7B themselves are not arranged adjacently each other, and fuel rods 3 are necessarily arranged among the groups. Each of the water rods groups are surrounded with fuel rods. As shown in FIG. 8, an upper end and lower end of each of the water rod 2 and the fuel rod 3 are supported by an upper tie plate 13 and a lower tie plate 14 respectively with fuel spacers 15 maintaining intervals between the fuel rods.

In the present embodiment, the fuel rods are arranged in the channel box 1 in triangle lattices with 11 lines by 10 rows. When taking 134 mm for inside width of the channel box as same as the conventional fuel assembly, it is necessary to make diameter of the fuel rod 10.3 mm and the pitch between fuel rods 13 mm in order to make uranium inventory in the fuel assembly 10A same per unit volume as the conventional fuel assembly. The fuel assembly of the present embodiment can be loaded with five more fuel rods than the conventional fuel assembly which has a fuel arrangement of square lattices of 10 lines by 10 rows.

Figure 1:
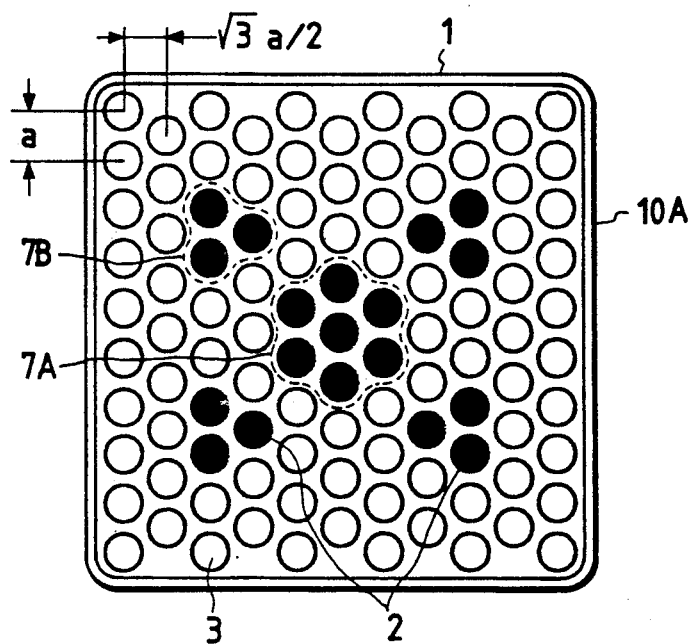
FIG. 1 is a horizontal cross section of the fuel assembly which is one of the preferable embodiments of the present invention.

In accordance with the fuel assembly 10A, taking for the longitudinal pitch of the fuel rods in FIG. 1, the horizontal pitch of the fuel rods becomes $\sqrt{3}a/2$ ($=0.87a$). Therefore, in the present embodiment, it is preferable to make the ratio of the number of arranged fuel rods in longitudinal direction and horizontal direction an integer close to 1 to 0.87 as possible, and make the shape of the whole fuel rods arrangement a square.

By the arrangement as above described, the fuel rods arranged in the manner of the present embodiment can be inserted effectively in the conventional channel box having a square cross section which is used for conventional fuel assembly. The fuel assembly 10A has smaller coolant path area in the channel box by about 5% than the conventional fuel assembly having same cross sectional area of the channel box. The coolant path means the path formed among the fuel rods 3 and the water rods 2.

Next, the number of the water rods is explained.

Figure 2:
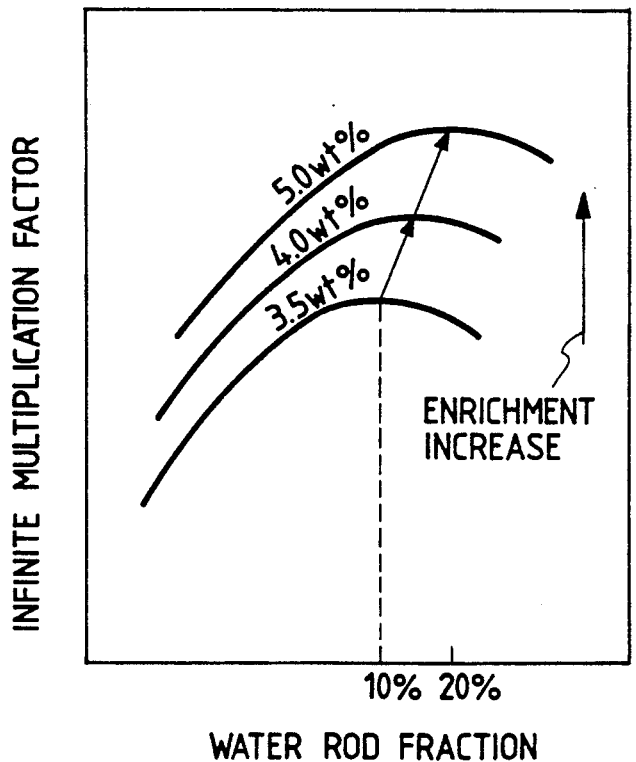
FIG. 2 is a graph illustrating the characteristics of the relation between the water rod fraction and the infinite multiplication factor.

The optimum number of the water rods 2 is determined by the characteristics of the relation shown in FIG. 2. That is, FIG. 2 shows the relation between the water rods 2 fraction (the fraction in number of water rods to the total number of rods 3 which are able to be arranged in the fuel assembly, that is to say, the sum of the number of the fuel rods 3 and the number of the water rods 2) and the infinite multiplication factor with average enrichment of the fuel assembly as parameters. According to the relation, it is understandable that the void reactivity coefficient can be decreased and, further, high burn up and economical use of the fuel assembly can be achieved with highly enriched fuel by making the water rod fraction at least 10%. Accordingly, the number of the water rods has to be increased as the average enrichment of the fuel assembly is increased. In case of the present embodiment, the average enrichment of the fuel assembly 10A is 4.9% and number of the water rods 2 is 19. The water rods 2 are divided into a several water rods groups as above described, and the water rods groups are arranged not adjacently so as to make distribution of the moderator and the fuel in the fuel assembly homogeneous as possible.

The fuel assembly 10A of the present embodiment improves fuel economy as same level as the fuel assembly disclosed in JP-A-62-217186 (1987) by arranging a plurality of fuel rods and a plurality of water rods in the conventional fuel assembly. And, in accordance with the present embodiment, as arranged lattices of the fuel rods are increased with concurrent arrangement of many water rods 2 in keeping the water to fuel volume ratio almost same as the fuel assembly disclosed in JP-A-62-217186 (1987), void generating region caused by reduction of coolant path area is decreased. Consequently, the void reactivity coefficient becomes small and improvement in safety and operability of the boiling water reactors is realized.

According to the present embodiment, as the outer diameter of the water rod 2 is smaller than the fuel rods pitch, the water rods 2 in each water rods groups are not contacted each other and the coolant path is formed between the water rods 2. Therefore, the coolant path area in the fuel assembly 10A, especially the coolant path in the upper vapor-liquid two phase flow portion of the fuel assembly, can be increased. The increment causes reduction of pressure loss of the fuel assembly 10A, and maintenance of preferable nuclear thermal hydraulic stability is realized. It can be considered that the water rods having larger outer diameter than the fuel rod pitch as disclosed in FIG. 1 of JP-A-63-82391 (1988) are arranged in the fuel assembly having fuel arrangement in triangle lattices as the present embodiment instead of the water rods groups of the present embodiment. In this case, coolant flow in the fuel assembly is not uniform because of forming wider local portion of coolant path than the coolant path which is formed between the water rod and adjacent fuel rod. The ununiformity of coolant flow becomes a cause of lowering of maximum allowable power with the fuel assembly having dense fuel rods arrangement in triangle lattices. In accordance with the present embodiment, as the water rods 2 having smaller outer diameter than the fuel rods pitch are arranged, coolant flow in the fuel assembly 10A is uniform and the problem described above is not caused.

In accordance with the present embodiment, as a plurality of water rods in the water rods group are arranged adjacently each other, the void fraction in the coolant path which is formed among water rods 2 becomes small. Making the void fraction small relates to the expanding of the saturated water region area, namely, the region being substantially occupied with saturated water, which is formed around the water rods 2 in the water rods group, and consequently the void reactivity coefficient becomes small. Accordingly, safety and operability of the boiling water reactors are improved. The water rods group having the function as above described behaves as if it were a large water rod having same cross sectional area with the water rods group. Fuel economy is also increased because a plurality of water rods groups are arranged dispersedly in the fuel assembly.

Figure 3:
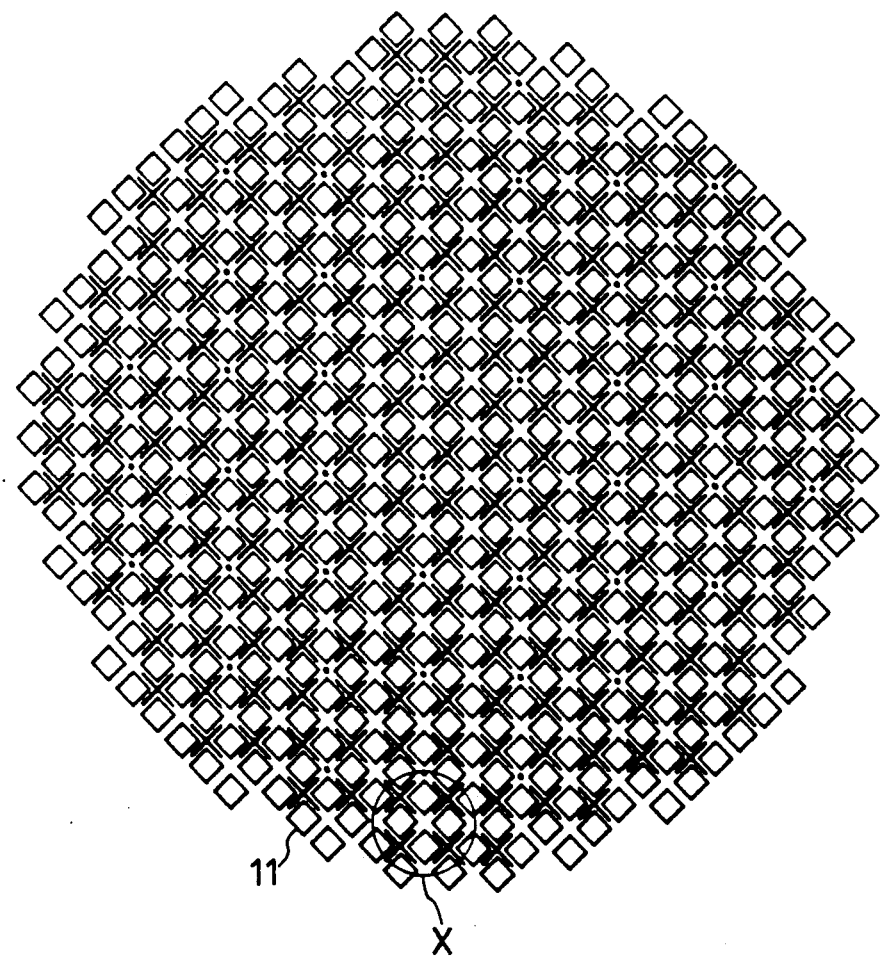
FIG. 3 is a schematic cross section of the boiling water reactor core.
Figure 4:
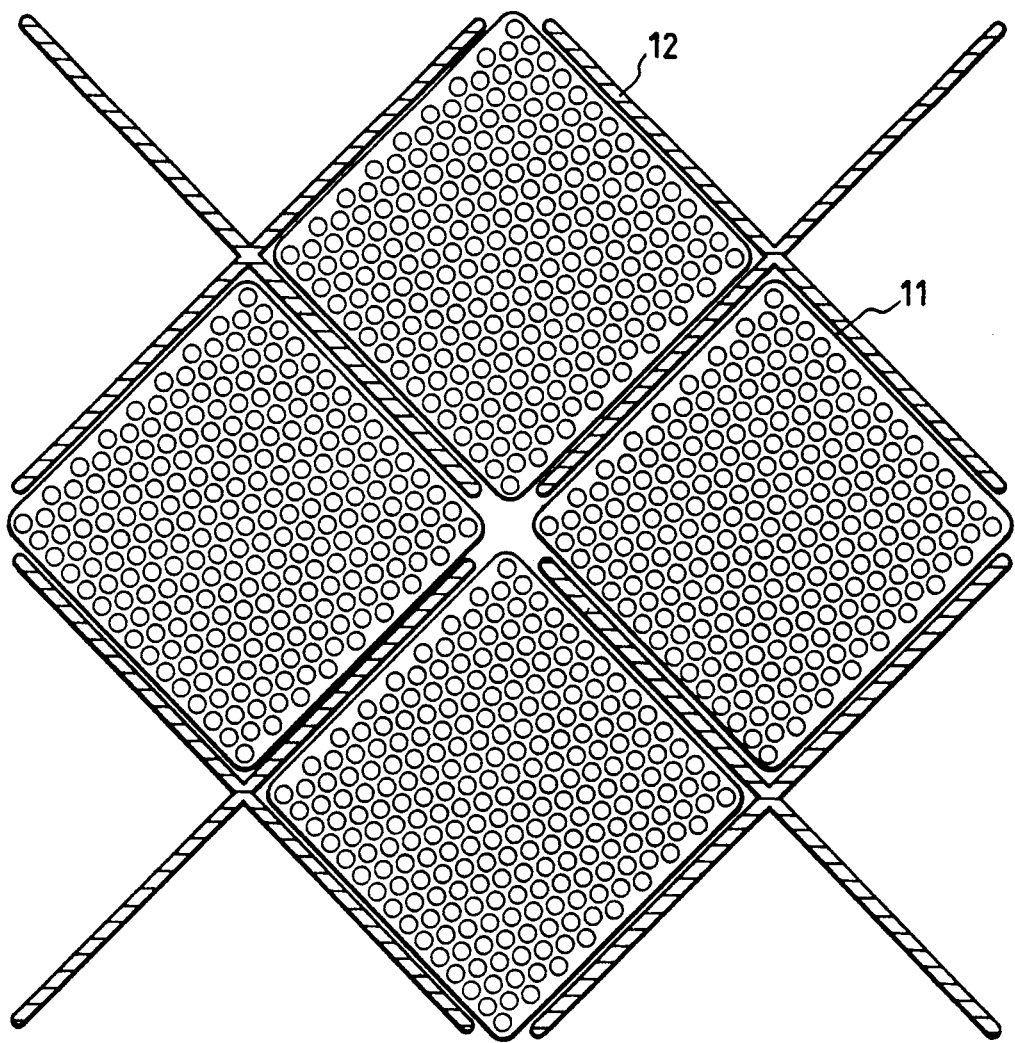
FIG. 4 is an enlarged illustration of the X portion of FIG. 3.
Figure 5:
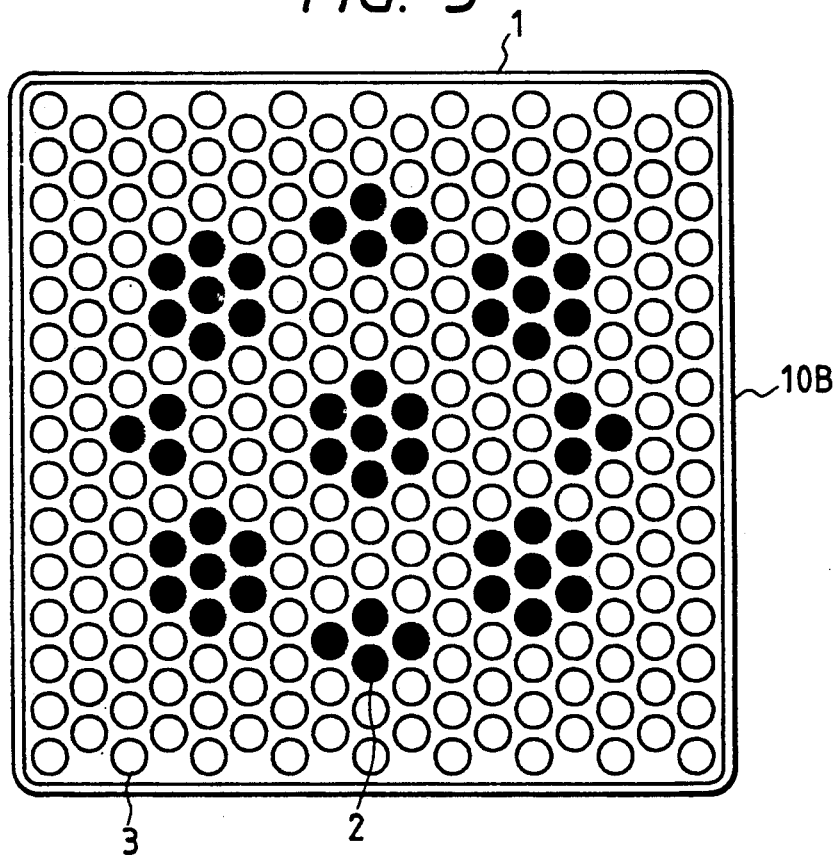
FIGS. 5, 6 and 7 are schematic cross sections of the other embodiments of the present invention.

The composition of the embodiment of the present invention applied to the fuel assembly 11 for the reactor core having large lattices shown in FIGS. 3 and 4 is illustrated in FIG. 5. In FIGS. 3 and 4, the numeral 12 indicates control rods. The length of a side of the cross section of the fuel assembly of the present embodiment shown in FIG. 5 is $\sqrt{2}$ times of the side of the cross section of the fuel assembly shown in FIG. 1. The fuel assembly of the present embodiment 10B comprises fuel rods 3 and water rods 2 which are arranged in triangle lattices in the channel box 1A as same as the fuel assembly 10A. The water rods group including a plurality of water rods 2 is arranged as same as the fuel assembly 10A. In accordance with the present embodiment, the same effect as the fuel assembly 10A is realized. Especially, as the present embodiment has more water rods 2 (the fraction of number of water rods 2 to the sum of the numbers of water rods 2 and fuel rods 3 is at least 10%) than the fuel assembly 11 shown in FIG. 4 (the fuel assembly disclosed in JP-A-62-259086 (1987)), unboiled region is increased. Accordingly, the void reactivity coefficient of the present embodiment becomes small. Especially, the void fraction becomes small in the coolant path formed between adjacent water rods 2 as described above, the e saturated water region is substantially increased in the coolant path. The void reactivity coefficient becomes small also by the function above described.

Figure 6:
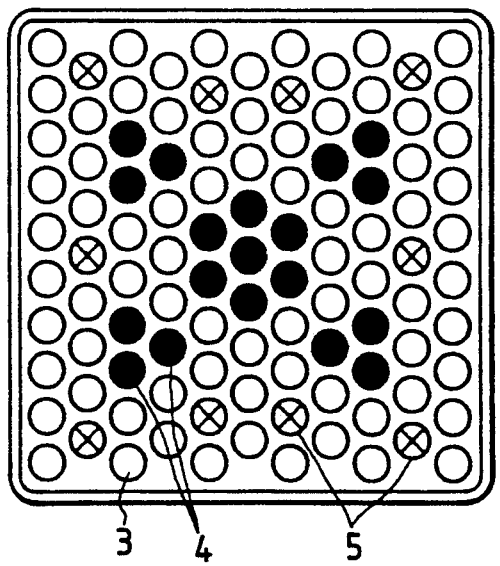

The fuel assembly relating to other embodiment of the present invention is illustrated in FIG. 6. The embodiment is same as fuel assembly 10A except the fuel rods 5 which replaced a part of fuel rods 3 and the water rods 4 which replaced all of the water rods 2. The fuel rod 5 has a shorter length in axial direction than the fuel rod 3. The fuel rod 5 is a fuel rod having a partial length. The water rod 4 has also a shorter length in axial direction than the fuel rod 3, and substantially same length as the fuel rod 5. The lower ends of the water rod 4 and fuel rod 5 are supported with the lower tie plate. Therefore, the space which becomes the coolant path is formed above the water rod 4 and the fuel rod 5. The space locates among the fuel rods 3. Almost of the fuel rods 5 are surrounded with the fuel rods 3.

In the manner described above, by using of the water rod 4 and the fuel rod 5 both of which have shorter length in axial direction, the area of cooling water path at the upper portion of the fuel assembly (vapor-liquid two phase flow region) having large pressure loss can be increased more than the lower portion of the fuel assembly. Accordingly, pressure loss of the fuel assembly 10C is reduced, and the hydraulic stability of the fuel channel is improved. The reason of the improvement is explained hereinafter.

For improvement of hydraulic stability of the fuel channel, it is important to reduce the pressure loss in the fuel channel. The friction pressure loss $\Delta Pf$ caused by vapor-liquid two phase flow in the boiling water reactor is expressed by following equation:

$$\Delta Pf = \frac{W^2}{2g\rho} \cdot \frac{f \cdot L}{D^2 \cdot A} \cdot \Phi \quad (1)$$

Where,

W : flow rate in the channel,
g : acceleration of gravity,
$\rho$ : density of water,
D : hydraulic diameter of the channel,
A : area of the channel flow path,
f : friction pressure loss coefficient, and
$\Phi$ : two phase flow friction pressure loss multiplication factor.

The upper region from the upper end of the effective fuel length of the fuel rod (the axial length of the fuel pellets loaded portion in the fuel rod) is scarcely effected by the fission reaction of the fissile material in the reactor core. The void fraction in this region is large. In the above equation (1), the two phase flow friction pressure loss multiplication factor becomes larger as the void fraction increases. Therefore, loading of water rods 4 and fuel rods 5 relates to increment of the coolant flow path area (the channel flow path area A) by forming the space above the water rods 4 and fuel rods 5 and shortening of the channel length L. Accordingly, the pressure loss of the fuel assembly 10C can be reduced depending on the relation expressed by the equation (1). In accordance with the present embodiment, same effect as the fuel assembly 10A is realized.

Figure 7:
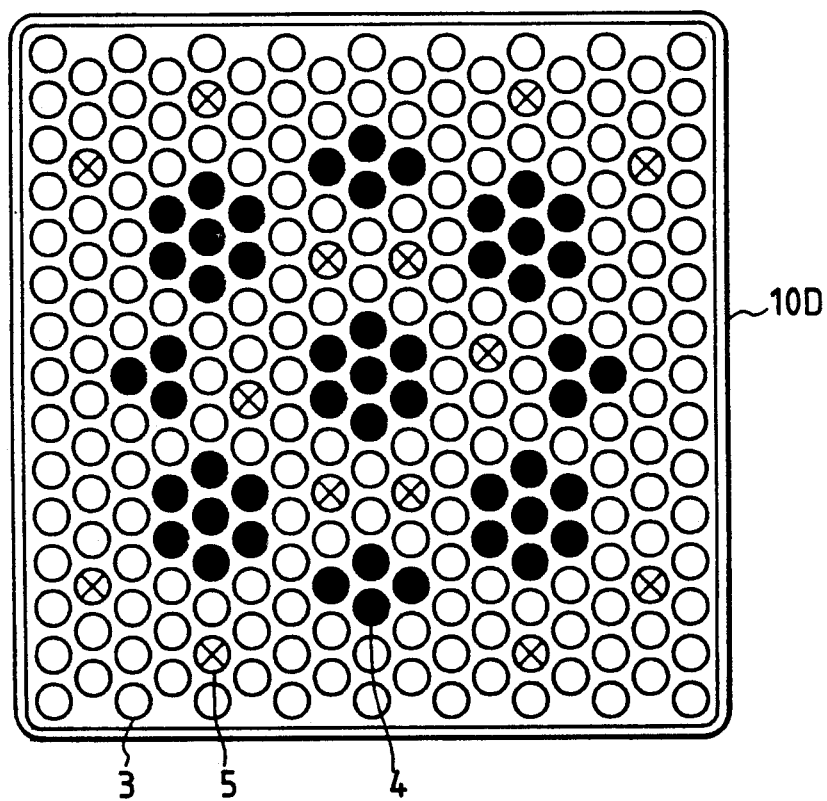

The fuel assembly 10D, which is other embodiment of the present invention, is illustrated in FIG. 7. In the present embodiment, the water rods 4 and the fuel rods 5 are applied to the fuel assembly 10B as same as the fuel assembly 10C. In accordance with the present embodiment, same effect with the fuel assembly 10C is realized.

What is claimed is:

1. A fuel assembly comprising
   a plurality of fuel rods containing fissile material being arranged at predetermined pitches in first and second directions and being arranged in triangle lattices,
   a plurality of water rods group arranged among said fuel rods,
   an upper tie plate and a lower tie plate which respectively supports each of an upper end and a lower end of the fuel rod or a water rod in the water rods group, and
   fuel spacers for maintaining intervals between the fuel rods,
   each of the water rods group including no fuel rod and with a plurality of water rods which are arranged adjacent to each other in triangle lattices having substantially the predetermined pitches of the fuel rods,
   the outer diameter of the water rod being smaller than the predetermined pitches, and
   the water rods groups being arranged not adjacent to each other and being surrounded with the fuel rods.

2. A fuel assembly as claimed in claim 1, wherein
   a fraction of the number of said water rods to a sum of the number of said fuel rods and the number of said water rods included in the fuel assembly is at least 10%.

3. A fuel assembly as claimed in claim 1, wherein
   said fuel rods comprise first fuel rods and second fuel rods, the second fuel rods having a shorter length in an axial direction than the first fuel rods.

4. A fuel assembly as claimed in claim 2, wherein
   said fuel rods comprise first fuel rods and second fuel rods, the second fuel rods having a shorter length in an axial direction than the first fuel rods.

5. A fuel assembly as claimed in claim 3, wherein
   said second fuel rods are located not adjacently to said water rods group, and are surrounded with said first fuel rods.

* * * * *